(12) United States Patent
Dejanovic et al.

(10) Patent No.: US 7,313,421 B2
(45) Date of Patent: Dec. 25, 2007

(54) GPS RECEIVER HAVING RF FRONT END POWER MANAGEMENT AND SIMULTANEOUS BASEBAND SEARCHING OF FREQUENCY AND CODE CHIP OFFSET

(75) Inventors: Thomas Dejanovic, Carindale (AU); Andrew Adams, Westgate (AU); Peter S. Single, Lane Cove (AU)

(73) Assignee: G2 Microsystems Pty. Ltd., Haymarket (AU)

( * ) Notice: Subject to any disclaimer, the term of this patent is extended or adjusted under 35 U.S.C. 154(b) by 500 days.

(21) Appl. No.: 10/952,967

(22) Filed: Sep. 28, 2004

(65) Prior Publication Data

US 2006/0068853 A1 Mar. 30, 2006

(51) Int. Cl.
*H04B 1/38* (2006.01)
(52) U.S. Cl. .................................. 455/574; 455/343.1
(58) Field of Classification Search ................ 455/574, 455/343.1, 456.1; 342/357.12; 375/134, 375/137
See application file for complete search history.

(56) References Cited

U.S. PATENT DOCUMENTS

| | | | |
|---|---|---|---|
| 5,774,876 | A | 6/1998 | Woolley et al. |
| 6,259,401 | B1 * | 7/2001 | Woo .................... 342/357.12 |
| 6,292,748 | B1 * | 9/2001 | Harrison .................. 701/213 |
| 6,400,272 | B1 | 6/2002 | Holtzman et al. |
| 6,504,503 | B1 | 1/2003 | Saint-Hilaire et al. |
| 6,509,828 | B2 | 1/2003 | Bolavage et al. |
| 6,539,281 | B2 | 3/2003 | Wan et al. |
| 6,614,351 | B2 | 9/2003 | Mann et al. |
| 6,624,752 | B2 | 9/2003 | Klitsgaard et al. |
| 6,687,609 | B2 | 2/2004 | Hsiao et al. |
| 6,700,533 | B1 | 3/2004 | Werb et al. |
| 6,745,027 | B2 | 6/2004 | Twitchell, Jr. |

(Continued)

FOREIGN PATENT DOCUMENTS

WO    WO 01/79988    10/2001

(Continued)

OTHER PUBLICATIONS

PCT Search Report, PCT/US04/43896, Dec. 30, 2004, G2 Microsystems PTY Ltd.

*Primary Examiner*—Lee Nguyen
(74) *Attorney, Agent, or Firm*—Blakely Sokoloff Taylor & Zafman LLP

(57) ABSTRACT

A GPS receiver includes baseband resources for simultaneous determination of carrier frequency shift and code chip offset. Reduction in the power consumption of a receiver is achieved by managing the sampling rate of an analog-to-digital converter, the intermediate frequency of the RF front end, and the front end bandwidth so these are appropriate to the current function of the receiver. In a GPS receiver during signal tracking, the IF, front end bandwidth, and ADC sampling rate are set as high as possible; during signal acquisition, the IF and front end bandwidth are set to relatively low values, and the ADC sample rate is set to a high value; and during ephemeris download, the IF, front end bandwidth, and the ADC sample rate are set to relatively low values. When a low battery condition is detected, the IF, front end bandwidth, and the ADC sample rate are set to relatively low values regardless of whether the GPS receiver is in the signal acquisition mode, signal tracking mode, or ephemeris download mode.

15 Claims, 3 Drawing Sheets

U.S. PATENT DOCUMENTS

| | | |
|---|---|---|
| 6,768,909 B1 * | 7/2004 | Irvin .................. 455/456.1 |
| 6,804,578 B1 | 10/2004 | Ghaffari |
| 6,853,294 B1 | 2/2005 | Ramamurthy et al. |
| 6,859,761 B2 | 2/2005 | Bensky et al. |
| 6,892,054 B2 | 5/2005 | Belcher et al. |
| 6,933,849 B2 | 8/2005 | Sawyer |
| 6,934,540 B2 | 8/2005 | Twitchell, Jr. |
| 6,961,541 B2 | 11/2005 | Overy et al. |
| 6,963,289 B2 | 11/2005 | Aljadeff et al. |
| 6,968,194 B2 | 11/2005 | Aljadeff et al. |
| 6,978,118 B2 | 12/2005 | Vesikivi et al. |
| 2002/0078363 A1 | 6/2002 | Hill et al. |
| 2003/0021367 A1 * | 1/2003 | Smith .................. 375/346 |
| 2003/0232598 A1 | 12/2003 | Aljadeff et al. |
| 2004/0024644 A1 | 2/2004 | Gui et al. |
| 2004/0024658 A1 | 2/2004 | Carbone et al. |
| 2004/0024660 A1 | 2/2004 | Ganesh et al. |
| 2004/0072577 A1 | 4/2004 | Myllymaki et al. |
| 2004/0100379 A1 | 5/2004 | Boman et al. |
| 2004/0203870 A1 | 10/2004 | Aljadeff et al. |
| 2004/0227630 A1 | 11/2004 | Shannon et al. |
| 2005/0128139 A1 | 6/2005 | Misikangas et al. |
| 2005/0131635 A1 | 6/2005 | Myllymaki et al. |
| 2005/0156711 A1 | 7/2005 | Aljadeff et al. |
| 2005/0181804 A1 | 8/2005 | Misikangas et al. |
| 2005/0197139 A1 | 9/2005 | Misikangas et al. |
| 2005/0207381 A1 | 9/2005 | Aljadeff et al. |
| 2006/0119471 A1 | 6/2006 | Rudolph et al. |

FOREIGN PATENT DOCUMENTS

| | | |
|---|---|---|
| WO | WO 03/032501 | 4/2003 |
| WO | WO 2004/006051 | 1/2004 |
| WO | WO 2004/013731 | 2/2004 |
| WO | WO 2004/074965 | 9/2004 |

* cited by examiner

GPS RECEIVER HAVING RF FRONT END POWER MANAGEMENT AND SIMULTANEOUS BASEBAND SEARCHING OF FREQUENCY AND CODE CHIP OFFSET

FIELD OF THE INVENTION

The present invention relates generally to methods and apparatus for reducing power consumption in radio receivers, and more particularly relates to reducing power consumption in a GPS receiver by simultaneously searching and tracking for frequency and code chip offsets in a baseband portion, and adjusting the IF and the ADC sample rate in an RF front end depending on operating mode.

BACKGROUND

The deployment in modern times of communication satellites in Earth orbit, such as those which form the space segment of the well-known Global Positioning System (GPS), have enabled, first, military systems, and subsequently, commercial systems to use signals from orbiting satellites to determine their location on Earth. In this way, the navigation of military and commercial vehicles by automatic guidance systems has been facilitated.

In addition to guidance system applications, signals from the Global Positioning System have been used in conjunction with various hardware and software products for providing terrestrial coordinates to users such as hikers and backpackers who want, or need, to know their locations. Similarly, fleets of motor vehicles, such as trucks, have been equipped with GPS systems so that their location can be determined, and in some instances, monitored.

As the application and acceptance of GPS-based location systems has grown, the cost of such GPS hardware and software has begun to decline. With declining prices, it is anticipated that the deployment of such location information resources in a wide variety of electronic and other types of products will become feasible. Achieving lower costs will help to make a number of technically feasible solutions into economically viable products.

In addition to costs that affect the purchase price of GPS-based systems or products, battery size and battery life are also important considerations. It is well-known that portable GPS-based location-aware products are typically battery powered. In order to extend the battery life, enable the use of a smaller battery, or both, reductions in the power consumption of the GPS-based system or product would be helpful. Many GPS-based systems can be envisioned in which the computational resources, or display resources, of those systems may be put into a sleep mode, or powered down state, for considerable periods of time. One portion of a GPS-based system that may be required to operate on a more regular basis is the GPS receiver itself. Thus a reduction in the power consumption requirements of the GPS receiver would be of great value.

In order to increase the acceptance, usefulness, and economic viability of GPS-based location-aware systems, further reductions in costs and power consumption are required.

What is needed are methods and apparatus for providing low-cost, low-power receivers in general, and low-cost, low-power GPS receivers in particular.

SUMMARY OF THE INVENTION

Briefly, a GPS receiver in accordance with the present invention provides one or more arrangements that allow for reduced cost, reduced power consumption, or both, as compared to conventional GPS receivers. GPS receivers in accordance with the present invention use a control loop that tracks both the frequency and C/A code simultaneously, thereby enabling the receiver to integrate over longer periods of time using low cost clock sources.

In a GPS receiver according to one aspect of the present invention, the baseband portion is operated at a frequency, or clock rate, that is not related to the carrier frequency or to the C/A code chipping rate.

In a GPS receiver according a further aspect of the present invention, a reduction in the power consumption of a receiver is achieved by managing the sampling rate of an analog-to-digital converter (ADC), and the intermediate frequency (IF) of the RF front end, so that these are appropriate to the current function of the receiver. The front end bandwidth may similarly be managed.

In a GPS receiver according to a still further aspect of the present invention, during signal tracking the IF, front end bandwidth, and ADC sampling rate are set as high as possible; during signal acquisition the IF and front end bandwidth are set to relatively low values, while the ADC sample rate is set to a high value; and during ephemeris download the IF, front end bandwidth, and the ADC sample rate are set to relatively low values.

In a still further aspect of the present invention, during ephemeris download the radio receiver can be turned off, or put into a sleep mode, when enough energy has been received to determine the data bit value, and turned back on again at the start of the next bit time.

In a still further aspect of the present invention, when a low battery condition is detected, the IF, front end bandwidth, and the ADC sample rate are set to relatively low values, trading power for accuracy, regardless of whether the GPS receiver is in the signal acquisition mode, signal tracking mode, or ephemeris download mode.

In a still further aspect of the present invention, during tracking, speculative integration can be used to extend integration across ephemeris data bit boundaries without aiding and before the bit time has been determined.

DETAILED DESCRIPTION

Figure 1:
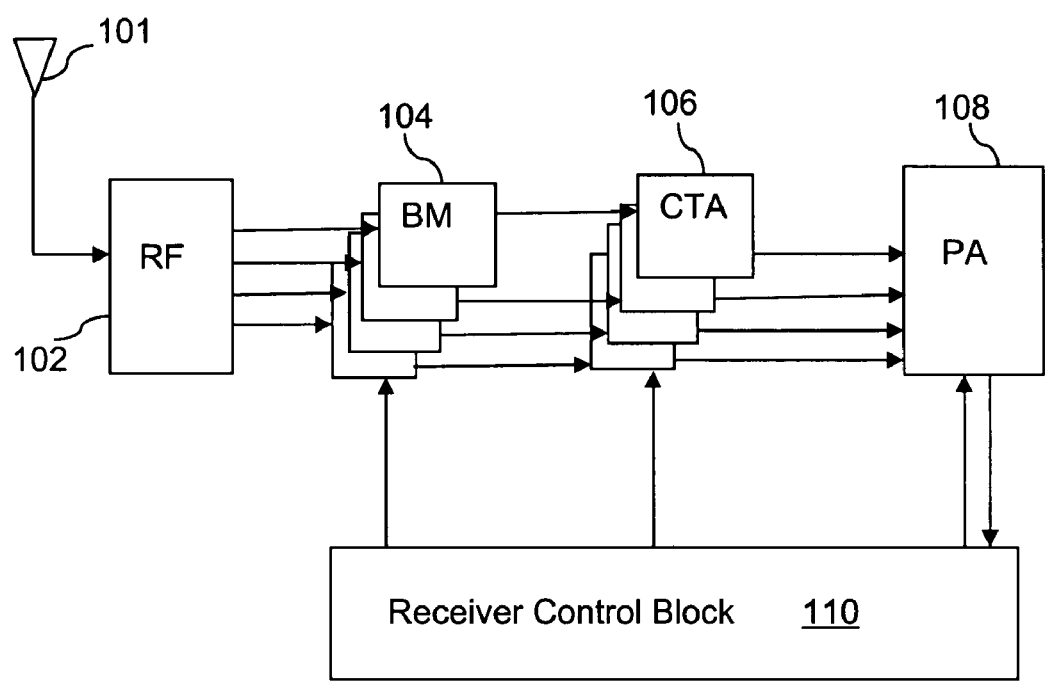
FIG. 1 is a high level block diagram showing a general architecture of a low-cost, low-power receiver in accordance with the present invention.

Generally, the present invention relates to reducing the cost and the power consumption of receivers, such as GPS receivers. In one aspect of the present invention, frequency and code offset tracking loops operate simultaneously, thereby allowing longer integration periods without requiring the precision of expensive clock sources. Additionally, since the longer integration time provides greater processing gain, the cost or power drain of an otherwise required low noise amplifier (LNA) is made unnecessary.

In another aspect, the present invention relates to reducing power consumption in a radio receiver by controlling one or more performance, or operational, characteristics of the receiver so as to use an amount of power consistent with a specific operating mode. In this aspect, the present invention relates to managing the sampling rate of an ADC and an intermediate frequency of the RF front end so that these are appropriate to a current GPS function (e.g., signal acquisition, signal tracking, and ephemeris download). The front end bandwidth may similarly be controlled so as reduce power consumption.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Terminology

Location-based services refer to an emerging class of applications and technologies that are directed to providing information or action based, at least in part, on the location of an object. Location-based services typically require the interaction of several components or subsystems. Four such components, or subsystems, are: a location information module, such as but not limited to, a Global Positioning System (GPS) receiver/processor which enables the location-awareness of an object; a wireless communications device within, or connected to, the object to communicate location information; a communications network infrastructure through which messages can be sent between the object and a location-based service provider; and software, typically executed by the location-based services provider, to support the delivery of services which are based, at least in part, on the location of the objects. Products, or objects, with the ability to determine and communicate their location are referred to in this field as location-aware devices, or location-aware objects.

The terms integrated circuit, semiconductor device, monolithic device, and microelectronic device, are often used interchangeably in the field of electronics generally. The present invention is applicable to all the above as they are generally understood in the field. Integrated circuits are also sometimes referred to as "chips". However, as will be appreciated by those skilled in the art, in the field of digital communications, the terms "chips" and "chipping rate" do not refer to an integrated circuit, but rather to data sequences timing information, respectively.

The expression "spread spectrum" refers to a type of modulation. In a typical spread-spectrum communication system, one or more pre-selected pseudorandom noise (PN) code sequences are used to modulate or "spread" user information signals over a predetermined spectral band prior to modulation onto a carrier signal for transmission as communication signals. PN spreading is a method of spread-spectrum transmission that is well known in the art, and produces a communication signal with a bandwidth much greater than that of the data signal.

With respect to the term, de-spreading, the GPS signal is a spread spectrum signal. Ignoring the P Code and Navigation data encoding on this signal, GPS signal spreading is done by using a pseudo random sequence of chips to modulate a 1.5 GHz carrier (i.e., multiply the carrier by the pseudo random sequence). This pseudo random sequence of chips is unique to each GPS satellite and is called the Coarse Acquisition code, or C/A code. To recover the signal the receiver must de-spread the signal. This requires the receiver to generate the same pseudo random sequence of chips at the correct offset in time and multiply it with the incoming signal. This has the effect of spreading everything in the signal that is not encoded at the bit sequence rate across the frequency spectrum.

The expression, Spurious-Free Dynamic Range (SFDR), is used herein in connection with the ADC. SFDR is the ratio of the RMS amplitude of the carrier frequency (i.e., maximum signal component) to the RMS value of the next largest noise or harmonic distortion component. SFDR is usually measured in dBc (with respect to the carrier frequency amplitude) or in dBFS (with respect to the full-scale range of the ADC.

The adjective, "approximately", is used herein to mean that the values specified in conjunction therewith are nominal values, and may actually above or below the specified value by an amount within commonly found tolerances due to the manufacturing of the described apparatus. The symbol "~" is used herein to mean approximately.

In the context of a GPS receiver, signal acquisition is essentially a two-dimensional search of frequency on one axis, and C/A code chip offset on the other axis. A typical search space for a 1 ms integration time is 16 frequency bins by 1023 code chip bins by as many as 28 codes, or satellite signals. Assuming that the power consumption of a receiver's RF front end dominates the receiver's active power consumption, it is desirable to search as much of the space as quickly as possible in order to reduce, or minimize, power consumption. This can be done in several ways, for example, by using a large number of correlators, thus enabling the simultaneous searching of multiple frequencies and/or multiple codes. Such an arrangement yields a first order result which is accurate to approximately one chip time (1 µs which translates to a navigation solution of approximately +/−300 m).

GPS receivers typically use traditional tracking loop designs, which are control loops that attempt to lock onto the C/A code after acquisition, leaving the frequency fixed. For a low-cost and low-power GPS receiver, this approach is somewhat problematic. Resolving the signal clearly in a low signal-to-noise ratio environment requires large gain. This large gain can be provided by adding a low noise amplifier to the receiver, however the LNA adds cost and power consumption. Similarly, the required gain can be provided by increasing processing gain, which implies long integration periods over which the receiver clock must be stable. However, low-cost clock sources are generally not very stable, that is, the cost of a clock source is typically proportional to its stability. Unfortunately, the stability performance of low-cost clock sources limits the maximum integration time and therefore limits the processing gain. Furthermore, longer integration periods result in additional power consumption.

It is also noted that receivers using traditional tracking loop designs have a large portion of the digital logic running at the C/A code chipping rate. In many cases the digital clock is actively tuned to closely, or exactly, match the chipping rate. This tuning has the side effect of creating a noise source at the frequency that the receiver is looking for, thereby reducing the spurious free dynamic range (SFDR) of the ADC. To overcome this side effect, the receiver needs higher gain (the costs of which are described above), or better digital noise filtering which in turn increases both silicon area and design effort, both of which add to the cost of the receiver.

To overcome the aforementioned difficulties, a low-cost, low-power, GPS receiver in accordance with the present invention, intended for implementation as an integrated circuit, uses a control loop that tracks both frequency shift and C/A code offset simultaneously, thus enabling the receiver to integrate over longer periods of time using low-cost clock sources. Alternatively, this enables a higher performance for the same cost as compared to a traditional GPS receiver.

In addition, the baseband portion of the GPS receiver in accordance with the present invention is run at a frequency that is not related to the carrier frequency or to the C/A code chipping rate. Although this does induce digital noise in the receiver, it is at an unrelated frequency, and when passed through the de-spreading portion of the receiver, this noise power is spread across the frequency spectrum, thereby reducing, or minimizing, its impact on receiver sensitivity. This effectively increases the sensitivity of the receiver.

At a high level, the GPS portion of a low-cost, low-power receiver in accordance with the present invention, is made up of an RF front end driving a number of baseband mixers (BM) which are paired with chip time accumulators (CTA), which in turn pass accumulated results to the pool of accumulators (PA). The PA state is monitored by a receiver control block (RCB) which controls signal acquisition and tracking.

An illustrative embodiment of the present invention is described with reference to FIG. 1. In the illustrative embodiment, an RF front-end 102 receives the incoming signal from an antenna 101 and mixes it down to an intermediate frequency (IF) which is sampled by an analog-to-digital converter (ADC). In this illustrative embodiment, the ADC sample rate is 22 MHz with an input bandwidth of 6 MHz. Each sample is a 3 bit complex value (I and Q). A module, or circuit, may be provided to monitor RF front-end 102 and provide automatic gain control (AGC) feedback to RF front-end 102.

Figure 2:
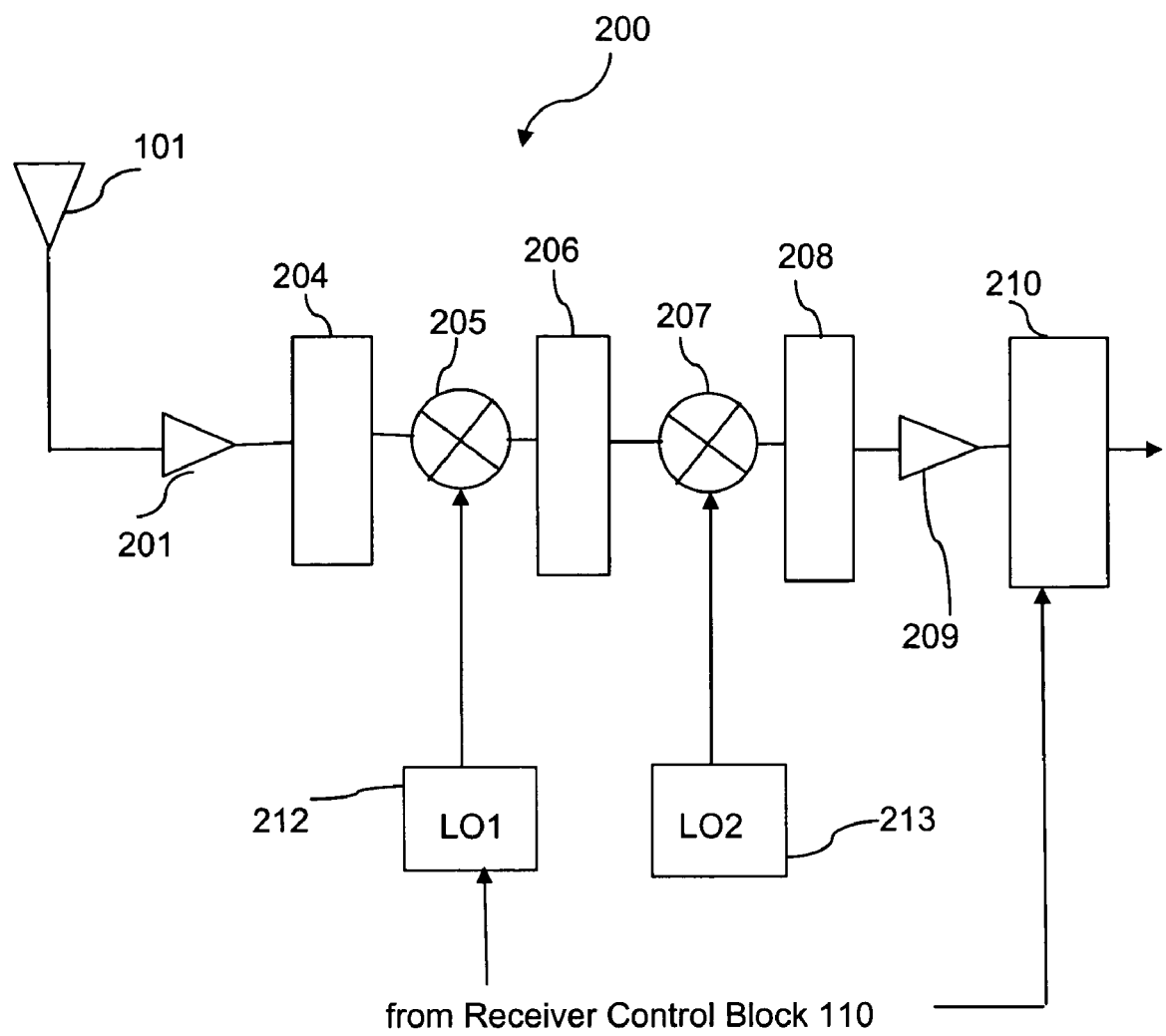
FIG. 2 is a block diagram of an illustrative RF front end suitable for use in a low-cost, low-power receiver in accordance with the present invention.

Referring to FIG. 2, a block diagram of an illustrative RF front end 200 suitable for use in a low-cost, low-power receiver in accordance with the present invention is shown. This is a general architecture for an RF front end suitable for use in the present invention, and it is noted that alternative RF front end arrangements may be used. As shown in FIG. 2, an antenna 101 is coupled to a low noise amplifier (LNA) 201. The output of LNA 201 is coupled to an input filter 204. The output of input filter 204 is coupled to mixer 205. Mixer 205 also receives the output of a first local oscillator 212. The output of mixer 205 is referred to as the intermediate frequency (IF), and is coupled to filter 206. The output of filter 206 is coupled to mixer 207. Mixer 207 also receives an input from second local oscillator 213. The output of mixer 207 is coupled to filter 208. In this illustrative embodiment of the RF front end, the output of filter 208 is coupled to an amplifier 209, the output of which is coupled to ADC 210. The output of amplifier 209 may be referred to as the analog baseband signal. ADC 210 is further coupled to receive one or more control signals from receiver control block 110 such that the sample rate of ADC 210 may be controlled. The output of ADC 210 may be referred to as the digital baseband signal.

In alternative embodiments of the present invention LNA 201 is not used and the antenna is coupled to input filter 204.

By eliminating LNA 201, the overall cost of the GPS receiver can be reduced, and the power consumed by the LNA is also eliminated.

In alternative embodiments, amplifier 209 may be eliminated, in which case the output of filter 208 is directly sampled by ADC 210.

In accordance with the present invention, first local oscillator 212 is coupled to receive one or more control signals from receiver control block 110. Receiver control block 110 commands local oscillator 212 to provide one of at least two different frequency inputs such that the intermediate frequency may be raised or lowered in accordance with the frequency supplied to mixer 205 by first local oscillator 212. In one embodiment of the present invention, local oscillator 212 is a voltage controlled oscillator (VCO) having an output frequency that is determined by the voltage of the control signal it receives from receiver control block 110. In another embodiment, local oscillator 212 comprises two or more fixed frequency oscillators and selection circuitry that, responsive to one or more control signals from receiver control block 110, selects as the output signal of local oscillator 212, an appropriate output of one of the fixed frequency oscillators. It is noted that, in the embodiment using multiple fixed frequency oscillators, power savings may be achieved by powering down one or more of the non-selected fixed frequency oscillators of local oscillator 212.

Referring again to FIG. 1, each baseband mixer 104 is programmed by a receiver control block 110 to search a particular Doppler bin, or frequency offset, by multiplying the incoming signal by a digitally synthesized IF signal. The result is a 3 bit complex number passed to a chip time accumulator 106. Each baseband mixer 104 runs at the ADC sample rate.

During signal acquisition, a number of baseband mixers 104 are allocated to searching for each satellite. The Doppler shift range (i.e., frequency search range) is approximately 10 KHz and is divided into a number of bins with each baseband mixer 104 programmed to synthesize a frequency centered in a bin. The maximum recommended width of each bin is defined as a function of the search time (fc ⅔ T). For signal acquisition, assuming a 1 ms search window, the frequency bins are 666 Hz wide, resulting in fifteen bins.

During signal tracking, at least three baseband mixers 104 are allocated to each satellite. The search, or integration, time may be increased to provide additional processing gain and thereby improve accuracy. A longer search time implies smaller (i.e., narrower) frequency bins. Baseband mixers 104 are configured so that the center baseband mixer 104 is aligned with the peak found during signal acquisition. The other baseband mixers are positioned on either side of the center baseband mixer in order to enable resolution of the peak. The bin size (i.e., the center frequency spacing of the baseband mixers) is reduced with each tracking loop iteration until the peak can not be resolved further. In other words, the peak can not be resolved further when the peak becomes so spread out that further reduction of the frequency spacing would not produce a clear peak in the frequency domain, i.e., across the baseband mixers. More than three baseband mixers 104 can be used per satellite, enabling closer spacing of the frequency bins, and better resolution of the peak in the frequency domain.

In order to reduce local clock error contributions, simultaneous tracking of at least four satellites is required. This implies the need for twelve baseband mixers (for three baseband mixers per satellite). More baseband mixers would be required if more than three baseband mixers per satellite were used.

Still referring to FIG. 1, each CTA 106 performs an integration over a code chip time, at the end of which it posts a result to a PA 108. CTA 106 increments a chip period counter by the sample period. When the chip period counter contains a value that is greater than or equal to the code chip period, the current accumulated result is pushed to PA 108, the chip period is subtracted from the chip period counter, and the accumulator is cleared. The accumulated result is a 7 bit complex value (I and Q). Each CTA 106 runs at the ADC sample rate.

During signal acquisition each CTA 106 is performing the same function, which is accumulation, or integration, over a C/A code chip time. CTAs 106 are all synchronized such that all the chip times are aligned in time. In an alternative arrangement, two CTAs 106 are provided for each baseband mixer 104, with the pair of CTAs being offset in time by half a chip time. This alternative would cost more in terms of gates, and requires more accumulator chains, but would enhance the ability of the receiver to resolve a weak satellite signal.

There are 12 baseband mixers (i.e., for tracking, 3 baseband mixers are required per satellite, and 4 satellites are tracked) each supported by a CTA. Each CTA 106 requires an accumulator chain. If each accumulator chain is 1023 accumulators long, then there are 12K accumulators in the receiver. For the alternative embodiment wherein each baseband mixer is supported by a pair of CTAs that are offset in time by half a chip time, there would be 24K accumulators.

When in tracking mode, three CTAs are connected to each baseband mixer. The CTAs are programmed, in a typical early, prompt, late configuration, so that the center CTA chip offset is aligned with the peak found during signal acquisition, and the CTAs on either side are programmed with fractional early or late chip offsets to enable resolution and tracking of the peak. The fractional chip spacing between each CTA is reduced with each tracking loop iteration until the peak can not be resolved further. In other words, the difference between the prompt value (the peak) and the early and late values is not large enough for the tracking loop to operate. In such an arrangement, 36 CTAs are required In order to support 12 baseband mixers.

Still referring to FIG. 1, a pool-of-accumulators 108 is structured in a way that supports a power saving sleep mode. In addition, there are a number of code generators that provide the current code chip value for use by the accumulators. Results pushed by the CTA are multiplied by the code chip value and then added by the accumulator. If the code chip value is '0', then the result is inverted before it is added, otherwise it is added as is.

During signal acquisition, a code generator is connected to a chain of up to 1023 accumulators and accepts results from on CTA (i.e., one code generator and accumulator chain is associated with each CTA). Each accumulator delays the code by one chip time before passing it on to the next accumulator in the chain. A chain of 1023 accumulators enables the receiver to simultaneously search the entire code offset space for one code (i.e., for one satellite). At the end of the search period (1 ms) the contents of all the accumulators are examined by a receiver control block 110 in order to find a peak. If no peak is found, the search is moved to a different portion of the search space. If a peak is found, its location (i.e., frequency offset and code offset) is recorded for use in tracking. A peak is typically a value that is at least 3 dB higher than any other value in the code offset search space.

If less than 4 satellites are found (i.e., 4 peaks) then the search period can be increased to improve the processing gain of the receiver and therefore increase sensitivity. Every doubling in the integration time increases the sensitivity by 3 dB. There is a limit to this process at 10 ms due to the 50 bits per second navigation data being modulated on the GPS signal. There is also a side effect that the Doppler bin spacing halves with each doubling of integration time. This means there are twice the number of bins to search and each search takes twice as long for each doubling of the integration time. If there are between 12 and 20 baseband mixers supported by CTAs at half chip time spacings then between 24 and 40 CTAs are required. Each CTA requires an accumulator chain. If each chain is 1023 accumulators long, then between 24K and 40K accumulators are required.

Subsequent to the signal acquisition mode, the receiver moves into a signal tracking mode. Once in signal tracking mode, only one code generator is required per baseband mixer, and one accumulator is required per CTA. The remaining accumulators may then be put into a sleep mode to reduce power consumption. During each iteration of the tracking loop, the accumulators integrate results from the CTAs. At the end of each iteration the values are read by receiver control block 110. Those values are then cleared in preparation for the next iteration.

In another alternative embodiment, the accumulator only accumulates for 1 ms and the result is pushed into a chain of accumulators which are used as registers. When an integration result is required, each chain of registers is summed a number of times to produce a result. Each iteration of the sum assumes an ephemeris data bit transition in a different location and different data value. For example, if there are 20 samples, the first iteration would assume no data transition and calculate a result. The second pass would assume there was a data transition after the first sample, so the first sample would be inverted and then added to all the other samples and if this result was larger than the first result it would be stored. The third pass would assume there was a data transition after the second sample, so the first and second sample would be inverted and then added to all the other samples and if this result was larger than the previous result it would be stored. This process is repeated until all the combinations are covered. The stored result is returned as the accumulation result for this period. Once the ephemeris data bit transition times are known, only two passes need to be done, one with no inversion at the bit transition time and one with an inversion. This is known as speculative integration as the process guesses what the data value could be in order to enable integration across an ephemeris data bit boundary and can be extended to enable unaided coherent integration across multiple ephemeris data bit times.

In various embodiments of the present invention a reduction in power consumption may be achieved by managing one or more of the RF front end bandwidth, the IF frequency, and the ADC sample rate. It is noted that there are several distinct modes of operation for a GPS receiver. These modes of operation are signal acquisition, signal tracking, and ephemeris download. By recognizing the differing performance requirements for each of these modes, and adjusting the receiver's modules to operate at the minimum, or near minimum, performance requirement for each mode, substantial power savings are realized.

During signal tracking, front end bandwidth, IF frequency, and ADC sample rate need to be as high as possible to improve, or maximize, the accuracy, and reduce, or minimize, the receiver on time. In the illustrative embodiment, the high value of IF is approximately 8 MHz. This is the baseline for GPS receiver operation.

During signal acquisition, a relatively low intermediate frequency (~3 MHz) and front end bandwidth (~2 MHz) can be used along with a fairly high ADC sample rate (~10 MHz). Low IF provides low RF and analog power. Low front end bandwidth provides larger Doppler bins in the frequency dimension of the search space, thereby reducing the search time, and reducing the power consumption. A high ADC sample rate provides processing gain that reduces the coherent integration time, and therefore reduces power consumption.

During ephemeris download a relatively low front end bandwidth (~2 MHz), and IF (~3 MHz) can be used along with a low ADC sample rate (2 MHz). The low IF and front end bandwidth have benefits as described above. The low ADC sample rate allows the entire digital portion of the receiver to run at the reduced clock rate with a power saving proportional to the reduction in operating frequency. This is possible because the signal being tracked has a very low data rate, so a large enough number of samples, even at 2 MHz, are provided to get sufficient processing gain to recover the signal. This mode provides a major benefit because it provides the greatest power saving for the mode in which a GPS receiver spends the longest time.

In another alternative embodiment, during ephemeris download, the radio receiver can be turned, off or put into a sleep mode, once enough energy has been received to determine the navigation data bit value in a 20 ms data bit period. This test for enough energy would be performed at the end of each PRN code reception (i.e., every 1 ms). With a strong GPS signal as little as 8 PRN codes (8 ms) of samples can give enough energy to resolve the navigation data bit, after which time the radio can be turned off for the remaining 14 codes in the bit time. Radio wake up time is in the micro-second time frame so one PRN code is lost due to shutting down and waking the radio. This allows the radio to be powered down for more than half the time during ephemeris download during favorable signal conditions.

Figure 3:
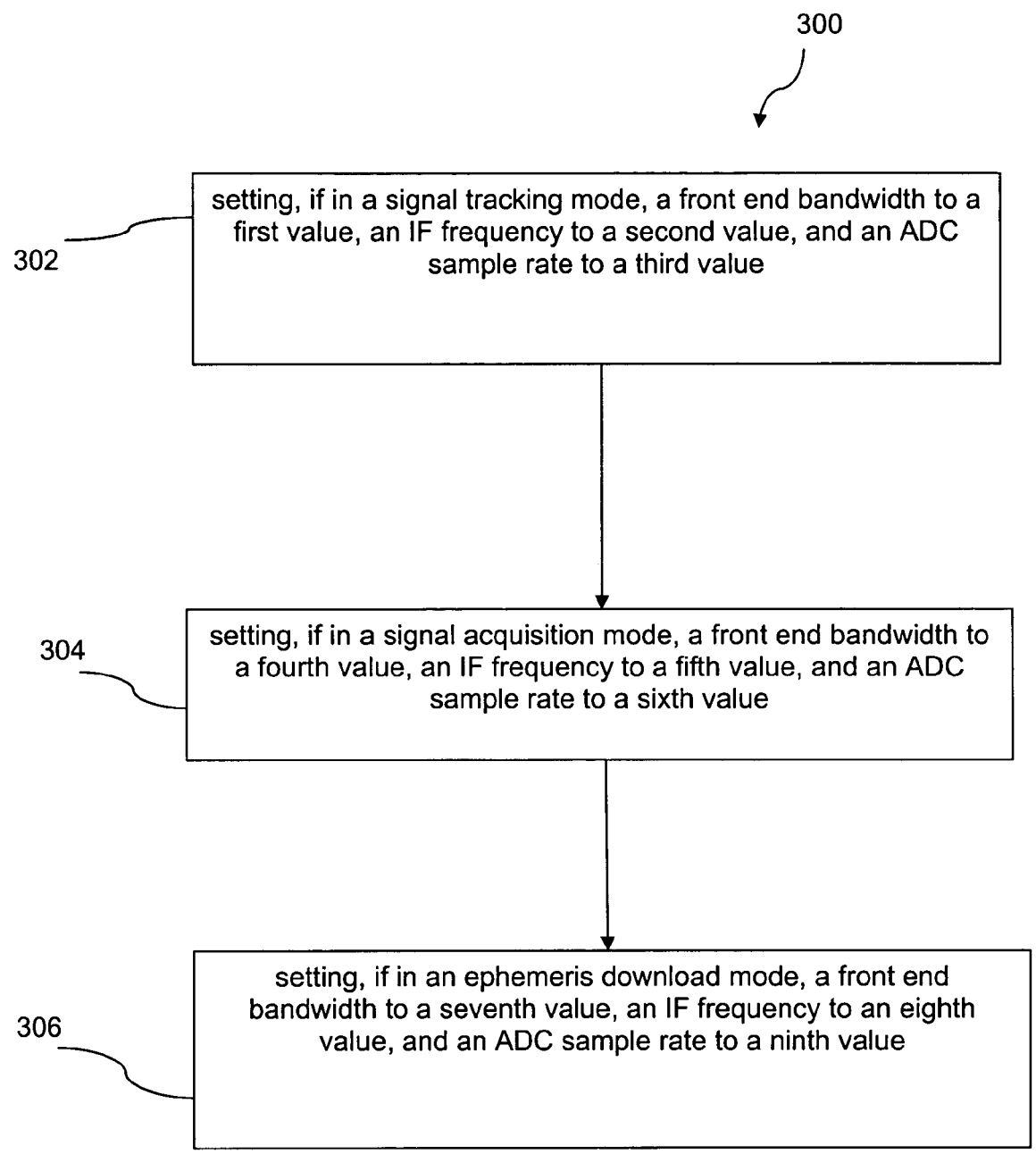
FIG. 3 is a flow diagram illustrating a method of operating a GPS receiver in accordance with the present invention.

A method of operating a GPS receiver having a front end, and a digital baseband processor, the front end including an IF stage and an ADC, is described with reference to FIG. 3. The illustrative method 300 includes setting 302, if in a signal tracking mode, a front end bandwidth to a first value, an IF frequency to a second value, and an ADC sample rate to a third value. During signal tracking, IF, front end bandwidth, and ADC sampling rate are typically set as high as possible. Method 300 further includes setting 304, if in a signal acquisition mode, a front end bandwidth to a fourth value, an IF frequency to a fifth value, and an ADC sample rate to a sixth value. During signal acquisition a relatively low intermediate frequency and front end bandwidth can be used along with a fairly high ADC sample rate. Method 300 further includes setting 306, if in an ephemeris download mode, a front end bandwidth to a seventh value, an IF frequency to an eighth value, and an ADC sample rate to a ninth value. During ephemeris download a relatively low IF and front end bandwidth can be used along with a low ADC sample rate.

It will be appreciated that other alternative receiver arrangements benefiting from the power management scheme disclosed herein may be constructed. For example, it is contemplated that a direct-to-baseband radio, that is one without an IF stage, can be controlled with respect to the performance/power tradeoffs in the ADC sample rate, and front end bandwidth.

In another alternative embodiment, two operational modes, each having a specific set of performance versus power settings, rather than three modes, may be used. For example, one operational mode may be used for signal acquisition and ephemeris download; and a second operational mode may be used for signal tracking.

In further alternative embodiments, control circuitry may look to the state of the receiver's battery power supply in making decisions regarding power management settings. For example, if the battery is running low, then the operational mode of the receiver may be set for lowest power consumption. Such an arrangement provides a trade-off between navigation solution accuracy and power saving.

CONCLUSION

Various embodiments of the present invention include methods and apparatus for improving the performance, and reducing the cost and/or the power consumption of radio receivers, and in particular GPS receivers.

Embodiments of the present invention may find application in a wide variety of location-aware products, and particularly in product applications that are sensitive to cost and power consumption.

An advantage of some embodiments of the present invention includes reduced power consumption by GPS receivers.

An further advantage of some embodiments of the present invention includes reduced cost for GPS receivers by eliminating the need for a low noise amplifier.

A further advantage of some embodiments of the present invention includes reduced cost for GPS receivers by enabling longer coherent integration times, and thus greater processing gain, without requiring expensive clock sources.

A further advantage of some embodiments of the present invention is that a variety of location-based services are enabled by the availability of low-cost, low-power GPS receivers.

A still further advantage of some embodiments of the present invention is that by reducing the power consumed by a GPS receiver, more battery power may be allocated to a transmitter or transceiver that is often found in conjunction with the GPS receiver in location-aware products. This extra transceiver power may allow for communication over greater distances while maintaining a specified operating time for a given battery charge.

It is to be understood that the present invention is not limited to the embodiments described above, but encompasses any and all embodiments within the scope of the subjoined claims and their equivalents.

What is claimed is:

1. A GPS receiver, comprising:
an RF front end including an IF stage and an analog-to-digital converter;
a digital baseband processor coupled to receive a digital baseband signal from the analog-to-digital converter of the RF front end; and
control circuitry coupled to the RF front end and the digital baseband processor,
wherein a frequency of the IF stage is operable to be increased or decreased responsive to the control circuitry, a sample rate of the analog-to-digital converter is operable to be increased or decreased responsive to the control circuitry, and a bandwidth of the RF front end is operable to be increased or decreased responsive to the control circuitry, and wherein during a signal acquisition mode the control circuitry sets the RF front end bandwidth to approximately 2 MHz, the intermediate frequency to approximately 3 MHz, and the ADC sample rate to greater than 10 MHz; during an ephemeris download mode the control circuitry sets the RF front end bandwidth to approximately 2 MHz, the intermediate frequency to approximately 8 MHz, and the ADC sample rate to approximately 2 MHz.

2. A method of operating a GPS receiver having a front end, and a digital baseband processor, the front end including an IF (Intermediate Frequency) stage and an ADC (Analog to Digital Converter), the method comprising:

setting, if in a signal tracking mode, a front end bandwidth to a first value, an IF frequency to a second value, and an ADC sample rate to a third value;

setting, if in a signal acquisition mode, a front end bandwidth to a fourth value, an IF frequency to a fifth value, and an ADC sample rate to a sixth value; and setting, if in an ephemeris download mode, a front end bandwidth to a seventh value, an IF frequency to an eighth value, and an ADC sample rate to a ninth value.

3. The method of claim 2, wherein the first value represents a front end bandwidth that is at or near the highest possible bandwidth of the front end, and the second value is approximately 8 MHz.

4. The method of claim 2, wherein the fourth value is approximately 2 MHz, the fifth value is approximately 3 MHz, and the sixth value is greater than approximately 10 MHz.

5. The method of claim 4, wherein the seventh value is approximately 2 MHz, the eighth value is approximately 3 MHz, and the ninth value is approximately 2 MHz.

6. The method of claim 2, setting an IF frequency comprises changing a local oscillator output frequency that is coupled to a mixer.

7. The method of claim 6, wherein the local oscillator comprises two or more fixed frequency oscillators and selection circuitry coupled thereto to select an output of one of the two or more fixed frequency oscillators, and further comprising powering down the non-selected fixed frequency oscillators.

8. The method of claim 2, further comprising:
determining whether a low battery condition exists; and
setting, if the determination is affirmative, the front end bandwidth to approximately 2 MHz, the IF to approximately 3 MHz, and the ADC sample rate to approximately 2 MHz, regardless of whether the GPS receiver is in signal acquisition mode, signal tracking mode, or ephemeris download mode.

9. The method of claim 2, further comprising:
simultaneously searching for carrier frequency shift and code chip offset.

10. The method of claim 9, wherein simultaneously searching for carrier frequency shift and code chip offset comprises simultaneously multiplying a digitized baseband signal by a plurality of digitally synthesized frequencies, each of the plurality of digitally synthesized frequencies being different from each other; and concurrently with the multiplying, integrating the result of each multiplication.

11. A GPS receiver comprising:
a front end including an IF (Intermediate Frequency) stage and an ADC (Analog to Digital Converter); and
a digital baseband processor coupled to the front end to control the front end bandwidth, the IF frequency and the ACD sample rate;
wherein the digital baseband processor:
sets, if in a signal tracking mode, a front end bandwidth to a first value, an IF frequency to a second value, and an ADC sample rate to a third value;
sets, if in a signal acquisition mode, a front end bandwidth to a fourth value, an IF frequency to a fifth value, and an ADC sample rate to a sixth value; and
sets, if in an ephemeris download mode, a front end bandwidth to a seventh value, an IF frequency to an eighth value, and an ADC sample rate to a ninth value.

12. The receiver of claim 11, wherein the IF stage comprises a local oscillator and a mixer and wherein setting an IF frequency comprises changing the output frequency of the local oscillator.

13. The receiver of claim 12, wherein the local oscillator comprises two or more fixed frequency oscillators coupled to the mixer and selection circuitry coupled thereto and wherein the digital baseband processor selects an output of one of the two or more fixed frequency oscillators, and powers down the non-selected fixed frequency oscillators.

14. The receiver of claim 11, wherein the digital baseband processor further:
determines whether a low battery condition exists; and
sets, if the determination is affirmative, the front end bandwidth to approximately 2 MHz, the IF to approximately 3 MHz, and the ADC sample rate to approximately 2 MHz, regardless of whether the GPS receiver is in signal acquisition mode, signal tracking mode, or ephemeris download mode.

15. The receiver of claim 11, further comprising circuitry for determining the state of a battery, and communicating the battery state.

* * * * *